United States Patent
Boyd et al.

(10) Patent No.: US 12,332,768 B2
(45) Date of Patent: Jun. 17, 2025

(54) PARALLEL EXECUTION DURING APPLICATION DEBUGGING

(71) Applicant: Amazon Technologies, Inc., Seattle, WA (US)

(72) Inventors: Richard Henry Boyd, Andover, MA (US); Jonathan M Henson, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 17/810,294

(22) Filed: Jun. 30, 2022

(65) Prior Publication Data
US 2024/0004780 A1    Jan. 4, 2024

(51) Int. Cl.
| G06F 9/44 | (2018.01) |
| G06F 9/445 | (2018.01) |
| G06F 9/455 | (2018.01) |
| G06F 11/3604 | (2025.01) |
| G06F 11/362 | (2025.01) |
| G06F 11/3668 | (2025.01) |

(52) U.S. Cl.
CPC ...... G06F 11/3632 (2013.01); G06F 11/3612 (2013.01); G06F 11/3684 (2013.01)

(58) Field of Classification Search
CPC ............. G06F 11/3632; G06F 11/3612; G06F 11/3684; G06F 11/3698; G06F 11/362
See application file for complete search history.

(56) References Cited

U.S. PATENT DOCUMENTS

| 6,275,956 | B1 | 8/2001 | On et al. |
| 7,512,934 | B2 | 3/2009 | Gatlin et al. |
| 9,569,339 | B1 * | 2/2017 | Villalobos ........... G06F 11/3636 |
| 11,144,432 | B2 * | 10/2021 | Joglekar .................. G06F 9/52 |
| 11,372,654 | B1 * | 6/2022 | Battle ..................... G06F 16/13 |
| 2011/0307741 | A1 | 12/2011 | Chen et al. |

(Continued)

FOREIGN PATENT DOCUMENTS

KR    100248376    3/2000

OTHER PUBLICATIONS

Mojtaba Bagherzadeh, Execution of Partial State Machine Models, 2022, pp. 1-22. https://ieeexplore.ieee.org/stamp/stamp.jsp?tp=&arnumber=9139402 (Year: 2022).*

(Continued)

*Primary Examiner* — Mongbao Nguyen
(74) *Attorney, Agent, or Firm* — S. Scott Foster; Kowert, Hood, Munyon, Rankin & Goetzel, P.C.

(57) ABSTRACT

An application debugger may define multiple unique initial states of execution for an application on behalf of a client. These unique initial states may include unique sets of application variable values. The application debugger may then create respective application runtimes initialized with the respective sets of application variable values. Then, the execution runtimes may be independently executed to a termination condition that may include a defined set of breakpoints, a normal termination or an abnormal termination. The application debugger may then receive termination state information from the respective execution runtimes, provide additional analysis of these termination states and report results to the client.

20 Claims, 8 Drawing Sheets

(56) References Cited

U.S. PATENT DOCUMENTS

| | | | | |
|---|---|---|---|---|
| 2019/0340103 | A1* | 11/2019 | Nelson | G06F 11/3636 |
| 2019/0354464 | A1* | 11/2019 | Peck | G06F 11/3698 |
| 2021/0081271 | A1* | 3/2021 | Doshi | G06F 21/53 |
| 2021/0263800 | A1* | 8/2021 | Takahashi | G06F 11/1438 |
| 2022/0164224 | A1* | 5/2022 | Mallavarapu | G06F 9/4881 |
| 2022/0398093 | A1* | 12/2022 | Talmor | G06F 11/3688 |
| 2023/0034567 | A1* | 2/2023 | Chen | G06F 8/41 |
| 2023/0342285 | A1* | 10/2023 | Angert | G06F 11/3696 |

OTHER PUBLICATIONS

Wei Cui, Research and Design of A Parallel Debugging Interface in A New Parallel Debugger Framework, 2018, pp. 1-5. https://ieeexplore.ieee.org/stamp/stamp.jsp?tp=&arnumber=4662845 (Year: 2018).*

Jianyi Zhou, Parallel Test Prioritization, 2021, pp. 1-50 https://dl.acm.org/doi/pdf/10.1145/3471906 (Year: 2021).*

* cited by examiner

PARALLEL EXECUTION DURING APPLICATION DEBUGGING

BACKGROUND

Debugging techniques may be used to find and resolve bugs, such as an error or flaw in an algorithm or in a piece of hardware. In some situations a debugging technique may require modification of application variables to verify correctness of application code. Conventionally, various code paths may be tested sequentially by repeatedly executing the application under test using unique variable values. While this process may be automated as part of software quality assurance testing or regression testing, during interactive debugging sessions such testing may frequently be time consuming and error prone.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An application developer frequently uses an application debugger, either as a stand-alone tool or as part of an Integrated Development Environment (IDE). Using a debugging too, developers may set one or more breakpoints in the application code to tell the IDE to pause execution when it reaches that point. Once a breakpoint is reached the IDE may pause execution and give the developer an option to inspect and change variables, memory content, or the application itself. This debugging process is completely linear in that there is a single path the debugger takes through the code from the start to the end of execution. The developer can influence that execution path, but they cannot consider multiple paths in the same debug execution.

Disclosed are various embodiments enabling parallel execution during application debugging. Parallel execution during application debugging allows a developer to specify multiple values for any variable, memory content, or element of code. When a multi-value entry is made, the entire running application, including heap and stack contents, register values, etc., may be duplicated for each unique element in the multi-value entry and then continue the debug process for each independent execution. This will allow a developer to test hypothetical code solutions in parallel without having to re-run the application multiple times.

Given these multi-value entries, an application debugger may define multiple unique initial states of execution for an application on behalf of a developer. These unique initial states may include unique sets of application variable or memory content values. The application debugger may then create respective application runtimes initialized with the respective sets of application variable values. Then, the execution runtimes may be independently executed to a termination condition that may include a defined set of breakpoints, a normal termination or an abnormal termination. The application debugger may then receive termination state information from the respective execution runtimes, provide additional analysis of these termination states and report results to the client.

In some embodiments, a service provider, such as a cloud computing service provider, etc. may operate a service provider network that offers a plurality of services, such as cloud-computing services to customers of the service provider network. For example, some such services may include virtualized computing services, virtualized data storage services, etc. Additionally, such services may include remote application development and test services that enables customers of the provider network to develop and test applications. Also, in some embodiments, remote hardware may encompass hardware operated by a service provider network that is remote from the customer.

In some embodiments, a service provider network may provide a an application testing service. In some such embodiments, the service provider network may provide an execution coordinator for clients of the service provider network to execute client applications using an application testing service. This execution coordinator may, in some embodiments, be a coordinator that interacts directly with a client via a client User Interface (UI) or Application Programming Interface (API). An example of such an interactive coordinator is an application debugger, such as a stand-alone debugger or a debugger component of a Integrated Development Environment (IDE). These debuggers and IDEs may further be integrated in to services also provided by the service provider network, in some embodiments.

Figure 1:
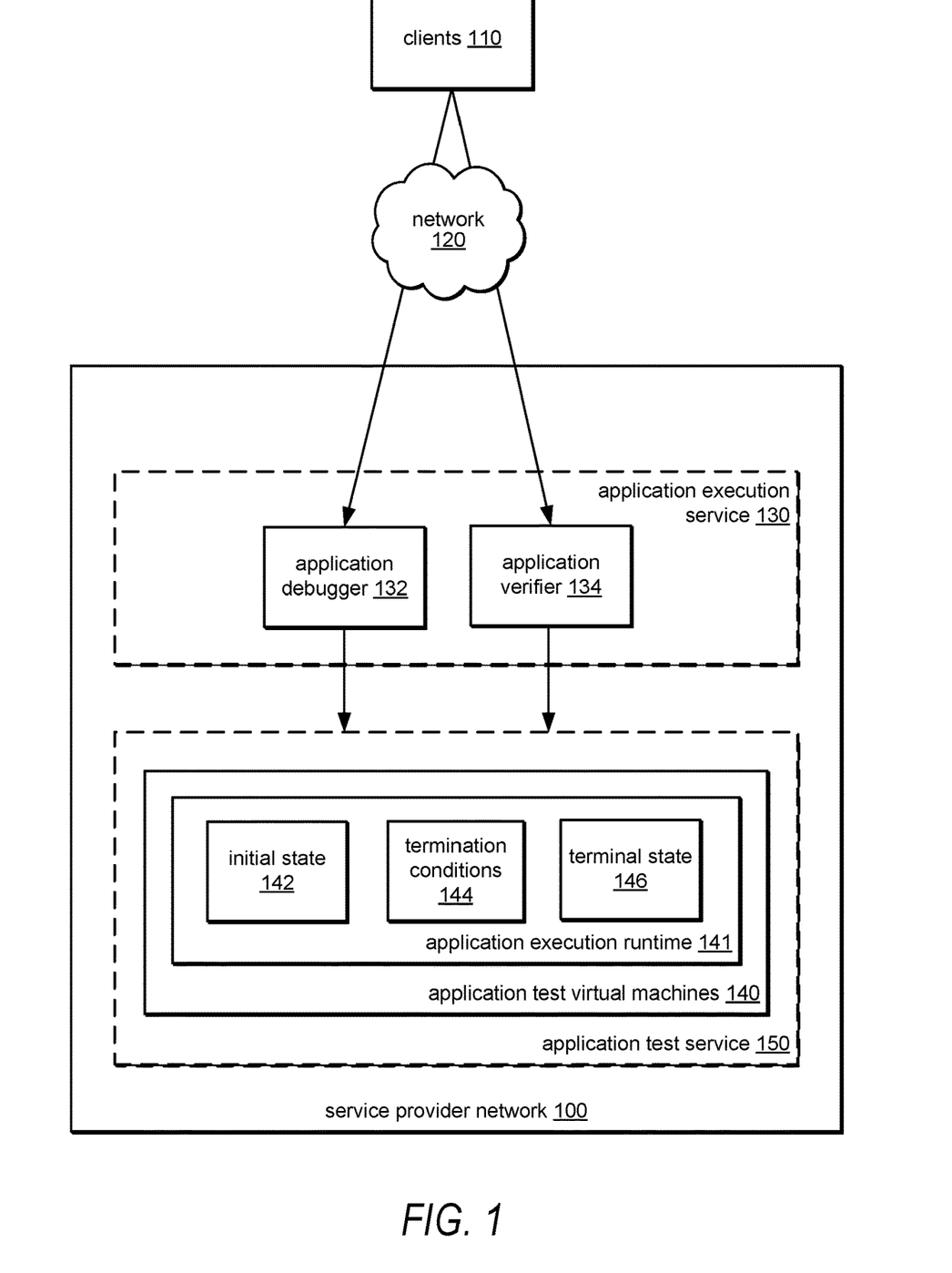
FIG. 1 illustrates a block-diagram of a service provider network that includes a application development and test services that enable parallel execution of applications during debugging, according to some embodiments.

FIG. 1 illustrates a block-diagram of a service provider network that includes an application development and test services that enable parallel execution of applications during debugging, according to some embodiments. A service provider network 100 may provide a number of services, including an application execution service 130 and an application test service 150, to clients 110 over a network 120. An example of the application execution service 130 is an application development service that may include application debugging and testing.

The application execution service 130 may further include one or more application execution coordinators, such as an application debugger 132 and application verifier 134. The application debugger 132 may serve, in some embodiments, to provide interactive development capabilities to clients 110 of the service provider network 100 while the application verifier 134 may provide, in some embodiments, non-interactive verification capabilities to clients 110, such as validation and regression services. These examples, however, are not intended to be limiting and the application execution service 130 may not be limited to application development testing, debugging and verification.

Upon request from a client 110 via a programmatic interface, API or UI, an execution coordinator, such as the application debugger 132 or application verifier 134, may request an application test service 150 to create one or more application test virtual machines 140, each providing an application execution runtime 141, in some embodiments. An application execution runtime 141 may, in addition to all required software such as operating systems and libraries (not shown) and application code to execute (not shown), include an initial state 142 and termination conditions 144. An initial state 142 may include various values for application variables, memory or parameters that collectively define a unique initial state, with different virtual machines 140, in the event that more than one virtual machine is created, have different unique initial states 142. Examples of termination conditions 144 may include, in various embodiments, code breakpoints, application variable watch values, normal and abnormal termination conditions, code assertions, code exceptions, maximum execution times and the like. These examples are not intended to be limiting and any number of termination conditions may be imagined.

Upon initiation of execution of the application execution runtime(s) 141 at the application test service 150, the various runtimes may terminate according to the termination conditions 144, in some embodiments. Once terminated, a runtime may include a terminal state 146 that may include terminal values for application variables, memory or parameters as well as information describing termination cause such as code breakpoints, application variable watch values, normal and abnormal termination conditions, code assertions, code exceptions, maximum execution times and so forth. These examples are not intended to be limiting and any number of termination conditions may be imagined.

An application coordinator may then analyze the terminal states 146 of the application execution runtimes 141, report results to the client, modify the number of application test virtual machines and initial states, and/or execute additional phases of the application, in various embodiments, as described below in FIGS. 2-7.

Figure 2:
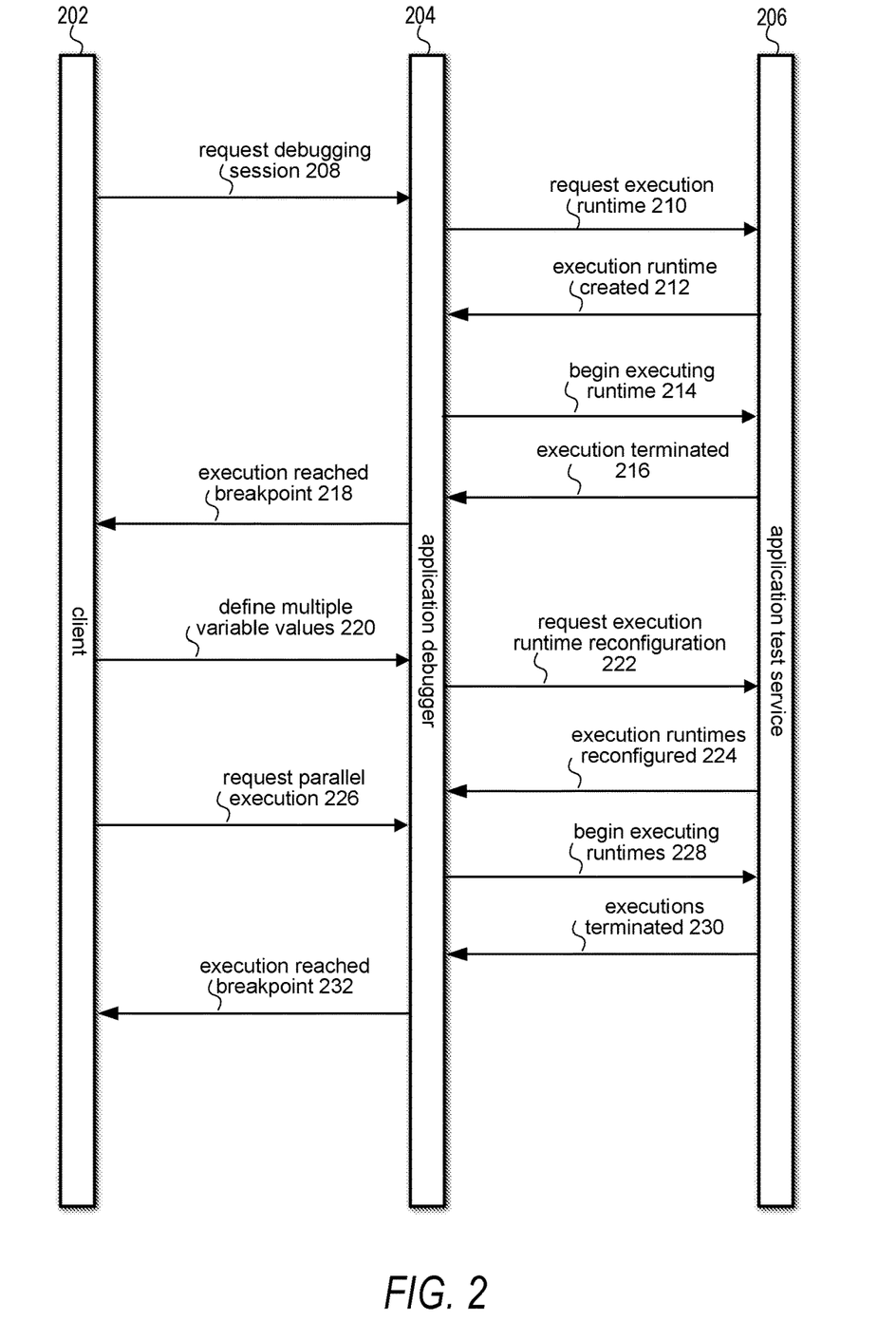
FIG. 2 illustrates example interactions between a client, an execution coordinator and an application test service that provides parallel execution of applications during test, according to some embodiments.

FIG. 2 illustrates example interactions between a client, an execution coordinator and an application test service that provides parallel execution of applications during test, according to some embodiments. As shown in 208, a client 202, such as one of the clients 110 of FIG. 1, may request a debugging session from an application debugger 204, such as the application debugger 132, in some embodiments. Responsive to this request, the application debugger 204 may request an application execution runtime 210 of an application test service 206, such as the application test service 150 of FIG. 1. This request may, in some embodiments, include information such as required software including operating systems, libraries and application code to execute, as well as initial state, such as initial state 142 of FIG. 1, and termination conditions, such as termination conditions 144 of FIG. 1, in some embodiments. This information may be provided in a number of ways. For example, the information could be provided within the submitted request or provided in additional messages or, in some embodiments, could be provided via an application bundle or image. These examples are not intended to be limiting and any means of providing such information may be imagined.

Responsive to the request, the application test service 206 may create an application test virtual machine, such as an application test virtual machine 140 as shown in FIG. 1, and create an application runtime to be executed within the application test virtual machine. This application runtime may be initialized with an initial state, such as the initial state 142 of FIG. 1, provided in the runtime creation request as discussed above. The runtime may be further configured to terminate execution according to provided termination conditions, such as the termination conditions 144 of FIG. 1. Examples of termination conditions 144 may include, in various embodiments, code breakpoints, application variable watch values, normal and abnormal termination conditions, code assertions, code exceptions, maximum execution times and the like. By providing and configuring termination conditions, the application runtime may execute non-interactively, regardless of whether the application debugger or other execution coordinator is interactive or non-interactive, and execute to completion, generating a terminal state, such as the the terminal state 146 of FIG. 1.

Once the application execution runtime is created, initialized and the terminal conditions configured, the application debugger may be notified as shown in 212, in some embodiments. The current state of the session may then include a single application runtime, as discussed below in FIG. 3. The application debugger 204 may then request that the runtime begin execution 214, in some embodiments. Responsive to this request 214, the application test service 206 executes the runtime to termination, generates a terminal state and indicates to the application debugger that execution has terminated 216.

In the illustrated example, execution of the runtime was terminated due to a set breakpoint. For example, a breakpoint may be configured as a termination condition at the entry point of the main function or method of the application in order to allow the client to begin testing and debugging of the application, in some embodiments. This is merely one example and any number of breakpoints or watchpoints may be employed. This breakpoint may be indicated to the client 202 as shown in 218.

Responsive to the breakpoint terminating execution, the client 202 may then, in some embodiments, define multiple values for an application variable or memory location 220. For example, an integral application variable, x, may have a terminal value of 0 at the breakpoint and the client may wish for execution to continue with the variable x having an integral value of 0 or 1. In this case, the application debugger may recognize two unique initial states for a second execution phase of the application. Multiple execution phases for the application is discussed in further detail below in FIG. 5.

The application debugger 204 may then, in some embodiments, request a runtime reconfiguration 222 of the application test service. This reconfiguration may be performed in a number of ways. In some embodiments, the single application runtime may be duplicated through allocation of an additional application test virtual machine and duplication of the application runtime in its terminal state. The individual runtimes may then be configured according to the new initial states and termination conditions, in some embodiments. It should be understood that this is merely one example of execution runtime reconfiguration and other reconfiguration techniques may be employed.

Once, the execution runtimes have been reconfigured, the state of the debugging session will provide multiple execution runtimes, as discussed below in FIG. 5. The application test service 206 may then indicate the completion of reconfiguration to the application debugger 204, in some embodiments.

The application debugger 204 may then request that the runtime begin execution 228, in some embodiments. Responsive to this request 228, the application test service 206 executes the runtimes independently and non-interactively to termination, generates respective terminal states for the runtimes and indicates to the application debugger that executions have terminated 230.

In the illustrated example, execution of the runtimes was again terminated due to a set breakpoint. For example, a breakpoint may be configured as a termination condition at the exit point of a function or method of the application that is dependent on the application variable x, in some embodiments. This is merely one example and any number of breakpoints or watchpoints may be employed. This breakpoint may be indicated to the client 202 as shown in 232. Optionally (not shown), the application debugger may further analyze the terminal states of the respective runtimes to determine if the terminal states represent a sufficiently similar terminal state such that the number of unique initial states of the application may be reduced, as discussed further below in FIG. 7.

Although not shown, the client may then further modify initial conditions of the application and execute any number of additional phases, as discussed below in FIG. 5.

Figure 3:
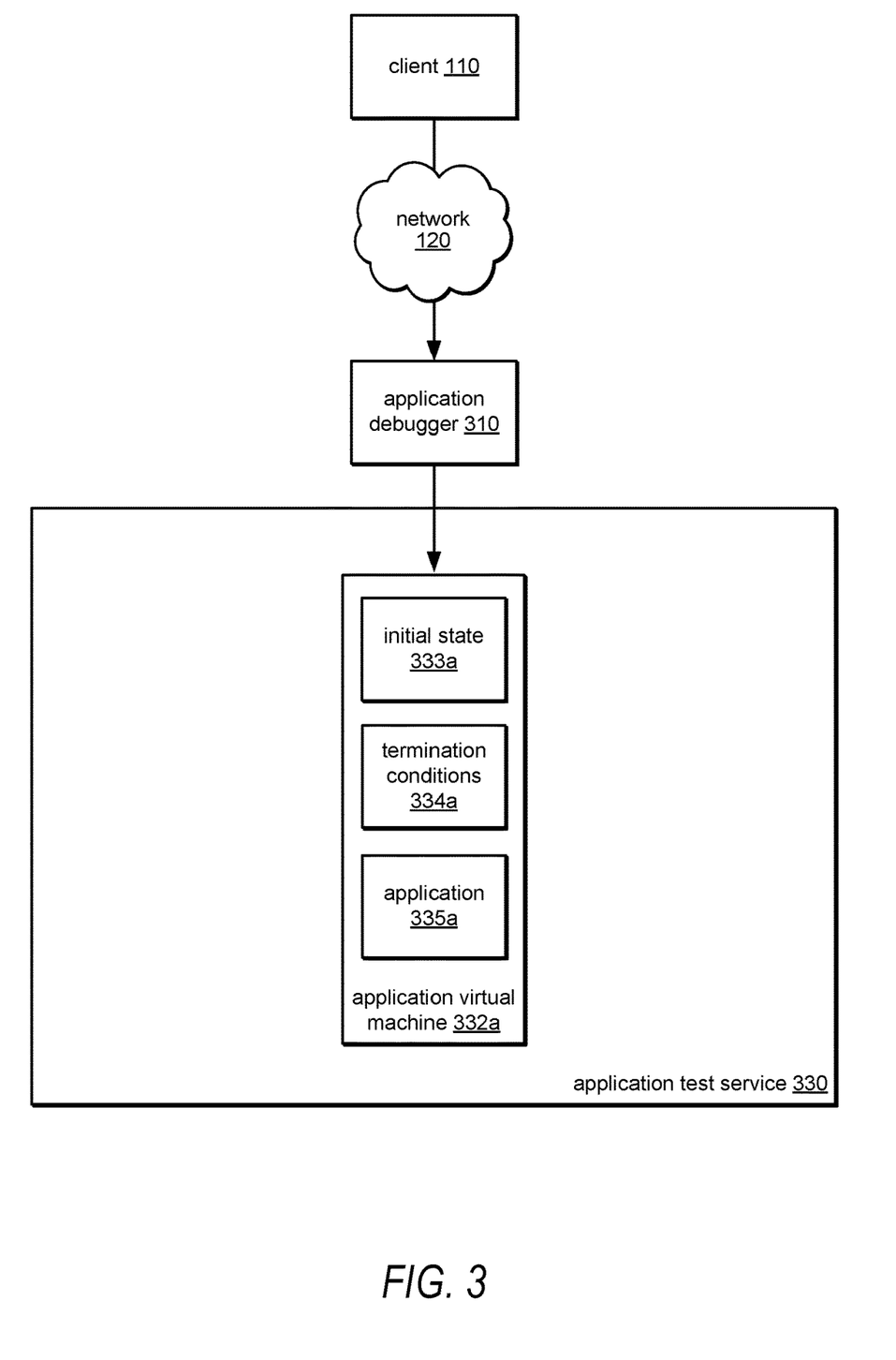
FIG. 3 illustrates an configuration of coordinated execution of a single instance of an application, according to some embodiments.

FIG. 3 illustrates an configuration of coordinated execution of a single instance of an application, according to some embodiments. A client 110 may connect via a network 120 to an application debugger 310, such as the application debugger 132 of FIG. 1, as part of performing an application debugging session. The application debugger 310 may, in turn, connect to a application test service 330, such as the application test service 150 of FIG. 1, which provides a single application virtual machine 332a, such as the application test virtual machines 140 shown in FIG. 1, for the application debugger 310. Included in the application virtual machine 332a are an initial state 333a, termination conditions 334a and application 335a of an application execution runtime (not shown).

Figure 4:
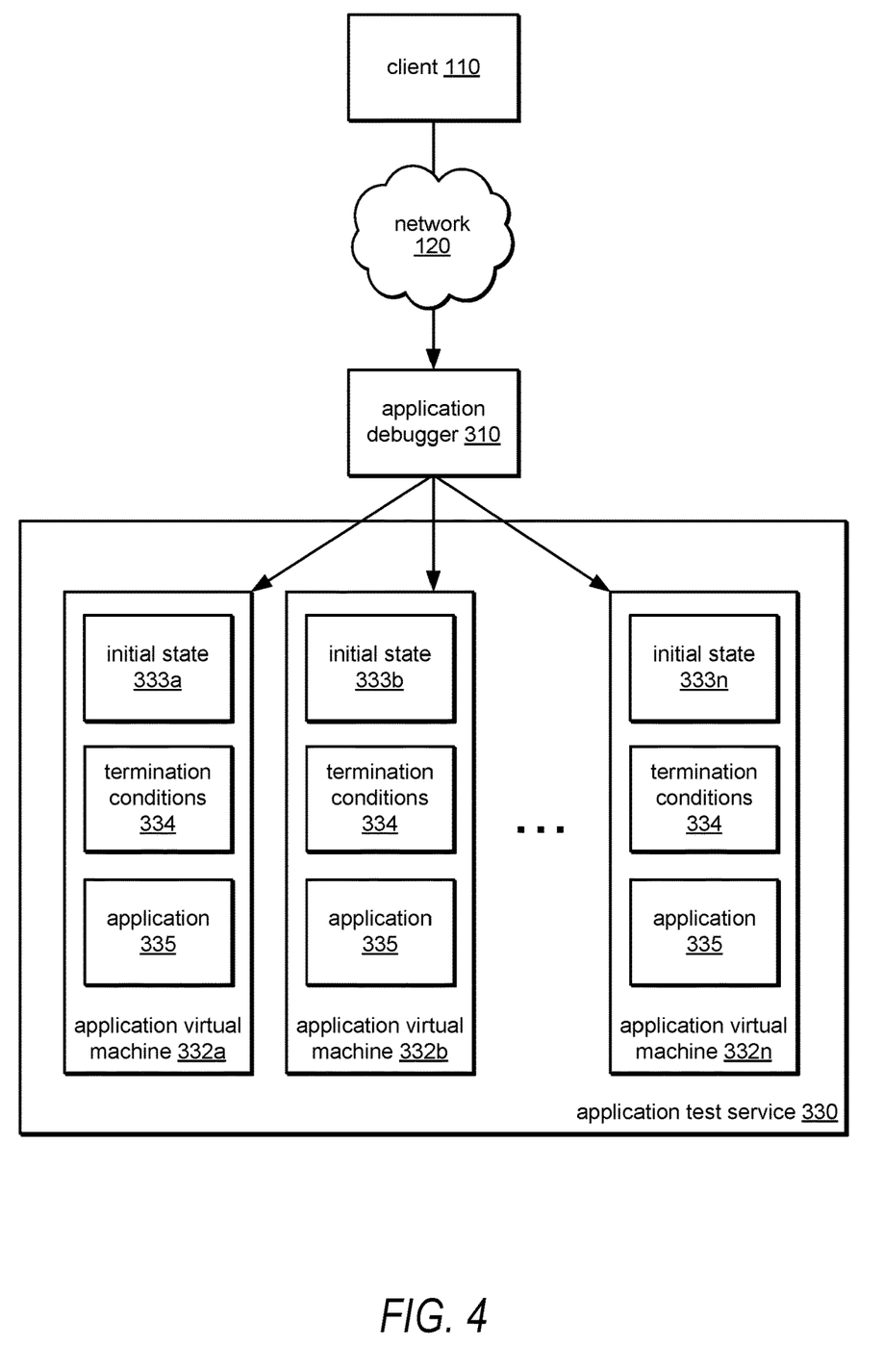
FIG. 4 illustrates an configuration of coordinated execution of a multiple instances of an application, according to some embodiments.

FIG. 4 illustrates an configuration of coordinated execution of a multiple instances of an application, according to some embodiments. A client 110 may connect via a network 120 to an application debugger 310, such as the application debugger 132 of FIG. 1, as part of performing an application debugging session. The application debugger 310 may, in turn, connect to a application test service 330, such as the application test service 150 of FIG. 1, which provides multiple application virtual machines 332a, 332b-332n, such as the application test virtual machines 140 shown in FIG. 1, for the application debugger 310. Included in the application virtual machine 332a, 332b-332n are an initial state 333a, 333b-333n, termination conditions 334 and application 335 of an application execution runtime (not shown). A number of application virtual machines 332 may be determined according to a number of unique initial states that are further determined by a number of unique sets of application parameters and may vary between execution phases of execution, as discussed below in FIG. 5.

Figure 5:
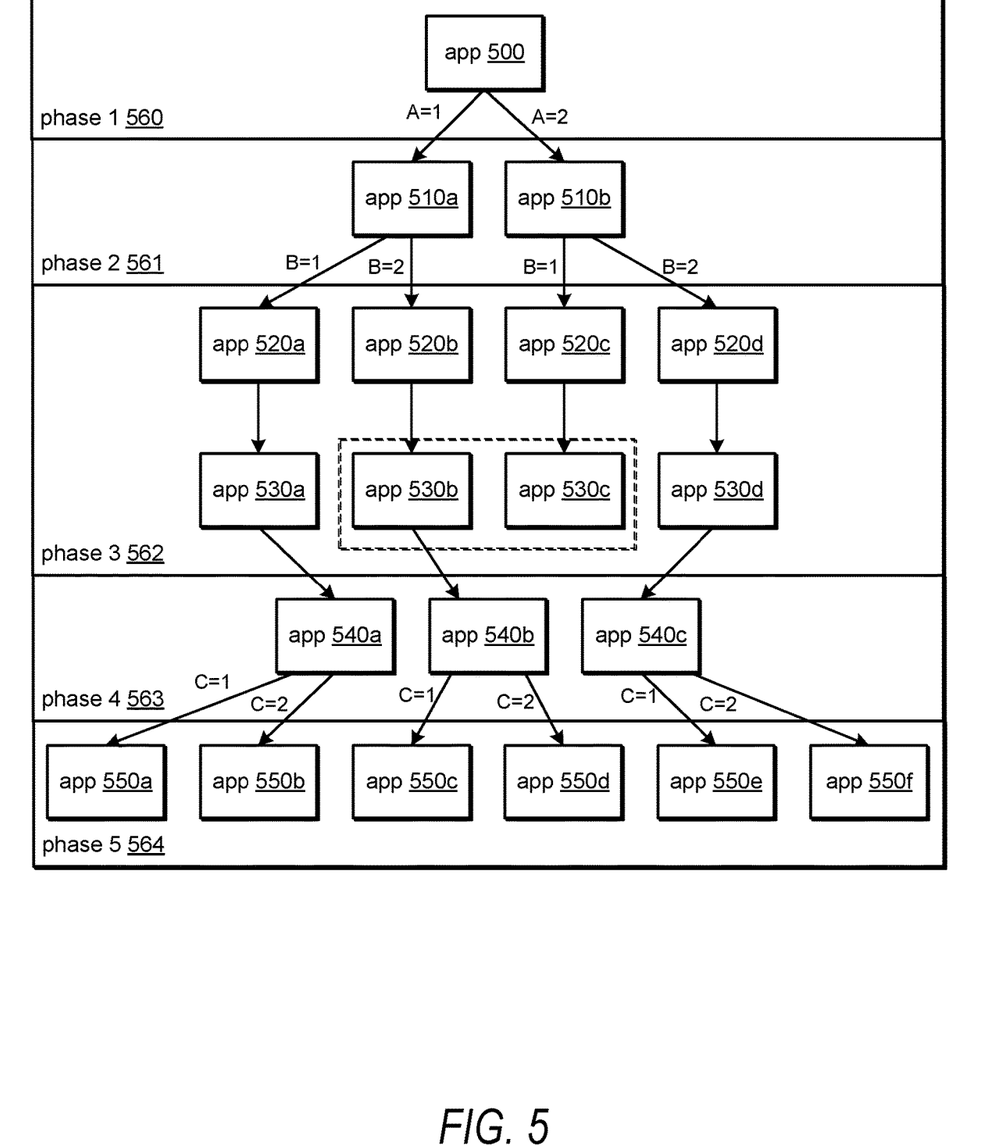
FIG. 5 illustrates multiple phases of coordinated execution of an application including a varying number of instances, according to some embodiments.

FIG. 5 illustrates multiple phases of coordinated execution of an application including a varying number of instances, according to some embodiments. In a first phase 560, a single application execution runtime 500 may have an initial state and be executed to completion producing a terminal state, such as is described in steps 210-216 of FIG. 2, in some embodiments. Subsequently, a client may define two possible values for an application variable A, shown as A=1 and A=2, to create to unique initial states of the application.

In a second phase 561, two application execution runtimes 510a and 510b may have unique initial states {A=[1, 2]} and be executed to completion producing terminal states, such as is described in steps 220-230 of FIG. 2, in some embodiments. Subsequently, a client may define two possible values for an application variable B, shown as B=1 and B=2, to create to four unique initial states of the application. These four initial states have two sets of application parameters, a set for application variable A and another set for application variable B. The unique initial states are then {A=[1,2], B=[1,2]}, or [A=1, B=1], [A=1, B=2], [A=2, B=1] and [A=2, B=2], in some embodiments.

In a third phase 562, four application execution runtimes 520a, 520b, 520c and 520d may have unique initial states {A[1,2], B=[1,2]} and be executed to completion producing terminal states 530a, 530b, 530c and 530d, such as is described in steps 220-230 of FIG. 2, in some embodiments. Upon analysis of the collective terminal states, such as described below in FIG. 7, it may be determined that two of the terminal states are sufficiently the same. As a result, the number of states exiting phase 3 may be reduced from four to three, with the execution runtime of 530b being sufficient to also represent the execution runtime 530c.

In a fourth phase 563, three application execution runtimes 540a, 540b and 540c may have unique initial states [A=1, B=1], [A=1, B=2] and [A=2, B=2] and be executed to completion producing terminal states, such as is described in steps 220-230 of FIG. 2, in some embodiments. Subsequently, a client may define two possible values for an application variable C, shown as C=1 and C=2, to create to six unique initial states of the application. These six initial states have three sets of application parameters, a set for application variables A, B and C. The unique initial states then become [A=1, B=1, C=1], [A=1, B=1, C=2], [A=1, B=2, C=1], [A=1, B=2, C=2], [A=2, B=2, C=1] and [A=2, B=2, C=2], in some embodiments.

In a fifth phase 564, the six application execution runtimes 550a, 550b, 550c, 550d, 550e and 550f may have unique initial states [A=1, B=1, C=1], [A=1, B=1, C=2], [A=1, B=2, C=1], [A=1, B=2, C=2], [A=2, B=2, C=1] and [A=2, B=2, C=2] and be executed to completion producing terminal states, such as is described in steps 220-230 of FIG. 2, in some embodiments. The process may continue for any number of phases. Furthermore, the number of unique states of the application may increase or decrease through analysis, such as discussed below in FIG. 7, or by input from the client, in various embodiments.

Figure 6:
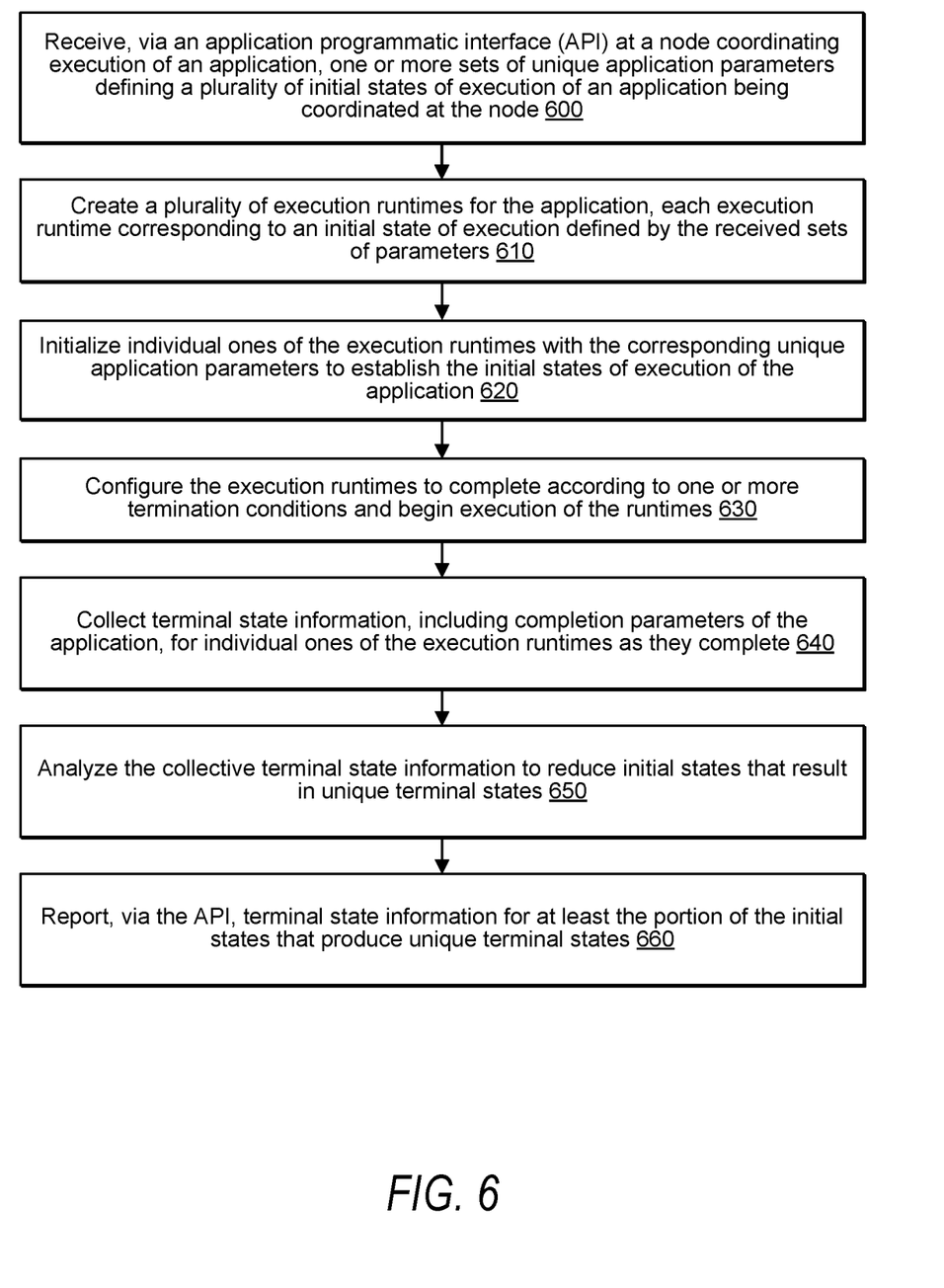
FIG. 6 is a flow diagram illustrating a single phase of coordinated execution of an application that provides parallel execution during test, according to some embodiments.

FIG. 6 is a flow diagram illustrating a single phase of coordinated execution of an application that provides parallel execution during test, according to some embodiments. The process begins at step 600 when one or more sets of unique application parameters that define unique initial states, such as the initial states 333 of FIG. 3, may be received at a node coordinating execution of an application, in some embodiments. An example of such receiving is shown in step 220 of FIG. 2.

Responsive to receiving the unique application parameters, as shown in 610 a plurality of execution runtimes may be created for the application such as is shown in 222 of FIG. 2, to create a system configuration as discussed above in FIG. 4. Individual ones of the created execution runtimes respectively correspond to a unique initial state defined by the received application parameters, in some embodiments.

Then, as shown in 620, individual ones of the execution runtimes may be initialized with the corresponding application parameters to establish the unique initial states of execution of the application, in some embodiments. The execution runtimes may be further configured, as shown in 630, to complete execution according to more termination conditions. The execution runtimes may then be non-interactively executed to termination, such as in steps 228 and 230 of FIG. 2, in some embodiments.

Upon completion of execution of the runtimes, as shown in 640, terminal state information may be collected, the terminal state information including completion parameters of the application. In some embodiments, the completion parameters of individual runtimes may be independently collected as the respective runtimes complete, while in other embodiments completion parameters may be collected upon completion of multiple, or all, execution runtimes.

The collective terminal state information may then be analyzed to reduce a number of initial states for future execution, the reduced number of initial states representing a number of unique terminal states, as shown in 650. This process is discuss in additional detail in FIG. 7.

Then, as shown in 660, terminal state information for at least the portion of the initial states that produce unique terminal states may be reported via the API.

Figure 7:
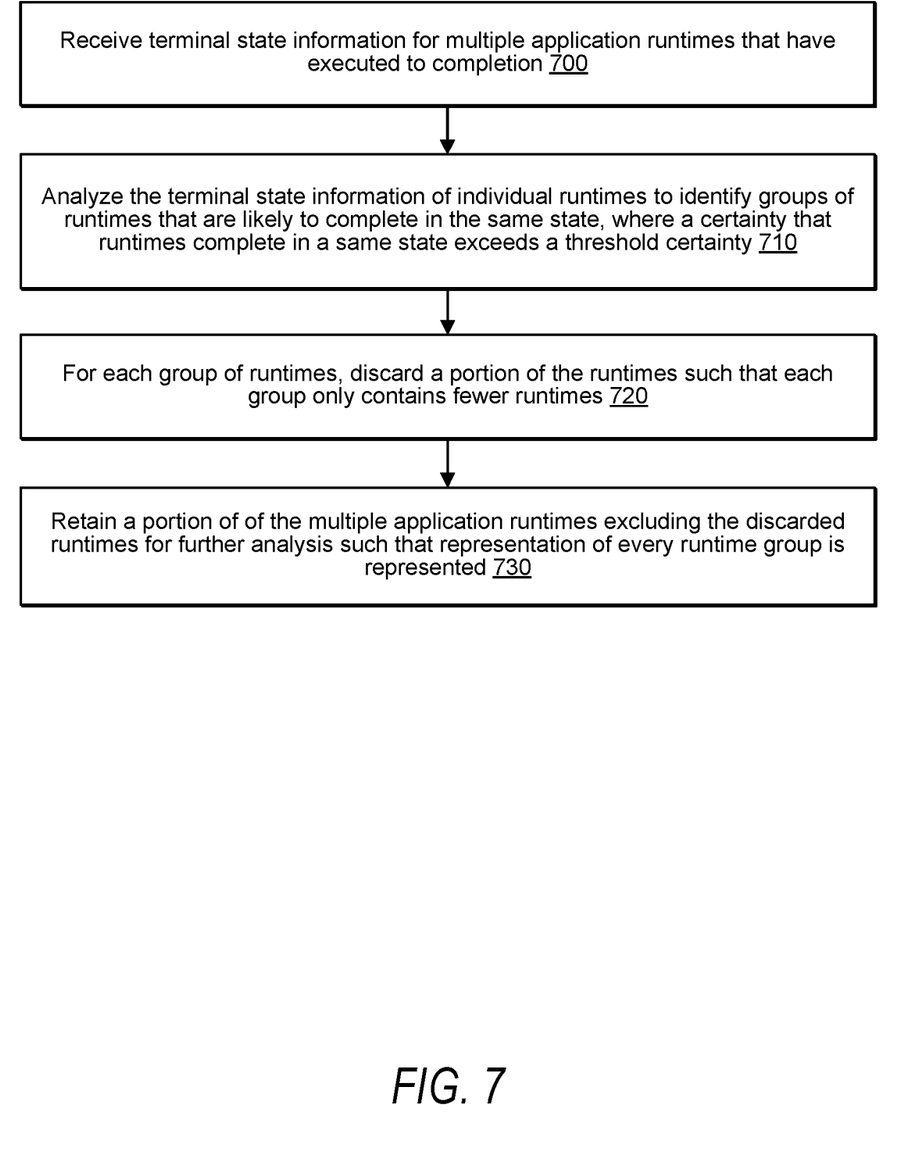
FIG. 7 is a flow diagram illustrating analysis of terminal state information of a single phase of coordinated execution of an application to reduce a number of initial states of the application, according to some embodiments.

FIG. 7 is a flow diagram illustrating analysis of terminal state information of a single phase of coordinated execution of an application to reduce a number of initial states of the application, according to some embodiments. The process begins at 700 where terminal state information for multiple application runtimes that have been executed to completion may be received, in some embodiments. Then, as shown in 710, the collective terminal state information may be analyzed to identify groups of runtimes that when further executed are likely to complete in a same state, where a certainty that future execution of the runtimes will complete in a same state exceeds a threshold certainty. In some embodiments, this analysis may be performed with assumptions regarding specific terminal state information, such as a termination condition causing termination of execution. Examples of this may include application variable watch values, normal and abnormal termination conditions, code assertions, code exceptions and so forth. In other embodiments, the analysis may employ application of machine learning or automated reasoning. These examples are not intended to be limiting and any number of analysis techniques may be employed.

As shown in 720, for each group of runtimes that, when further executed are likely to complete in a same state, discard a portion of the runtimes within the groups such that each group contains fewer representative runtimes, thereby reducing the total number of unique initial states. As shown in 730, a portion of the application runtimes is then retained, while excluding discarded runtimes, for further analysis and reporting such that representation of every runtime group is represented.

Illustrative Computer System

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Figure 8:
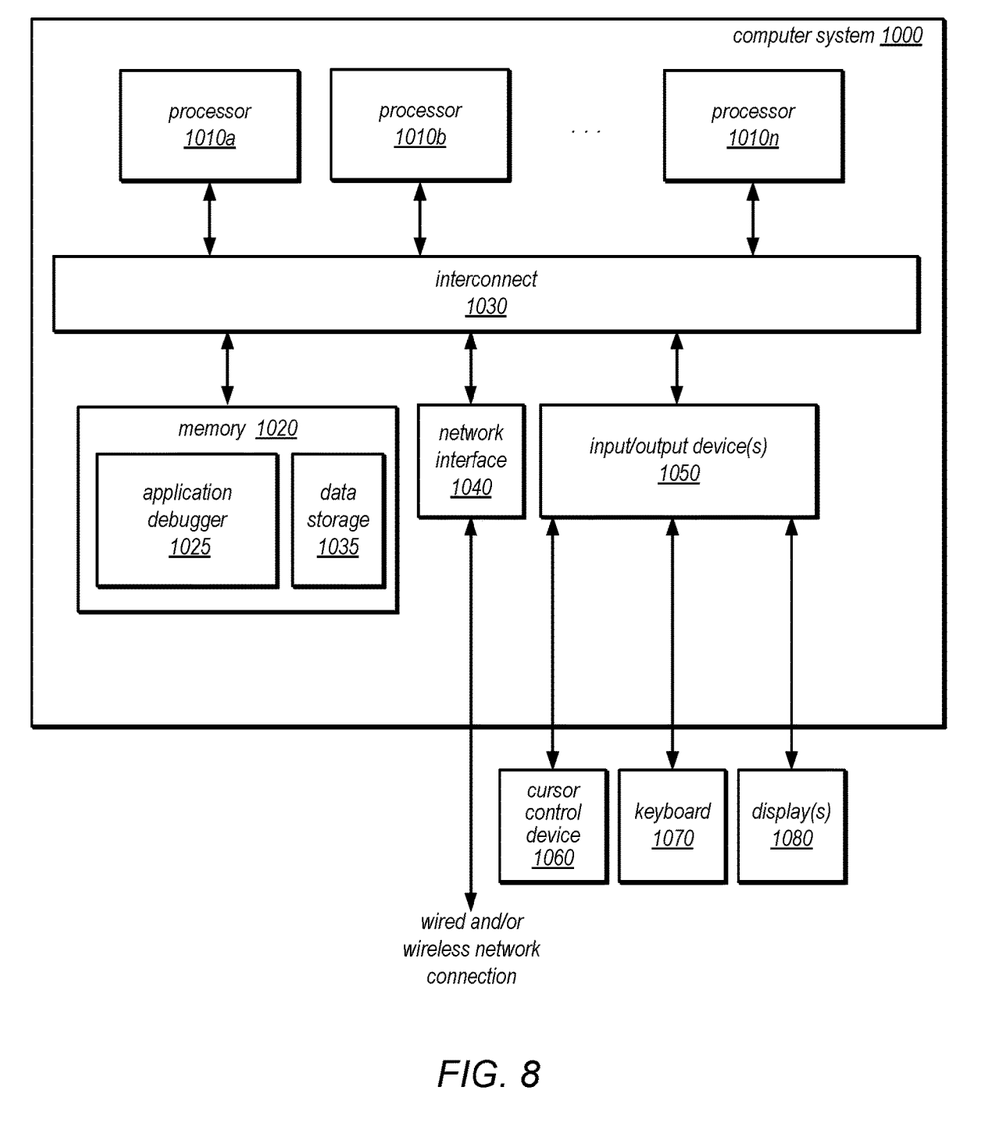
FIG. 8 is a block diagram illustrating an example computing device that may be used in at least some embodiments.

Embodiments of executing generated instruction sequences captured from software interactions as part of formal verification of a design under test as discussed above may be implemented as part of a computer system. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions, such as program instructions to implement a verification system 1025 (like formal verification system 110 or verification system 210 discussed above with regard to FIGS. 1 and 2) and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
   a computing node, comprising at least one processor and memory, implementing an application debugger configured to:
      receive a request to execute a plurality of execution runtimes of an application, the plurality of execution runtimes comprising respective unique sets of initialization values for different variables, wherein the unique sets of initialization values define a plurality of initial states of execution for respective ones of the plurality of execution runtimes of the application;
      cause, at a plurality of computing nodes different from the computing node, execution of the plurality of execution runtimes for the application corresponding to respective ones of the plurality of initial states, wherein the plurality of execution runtimes differ according to the respective unique sets of initialization values;
      receive respective sets of completion parameters from the plurality of computing nodes; and
      return one or more unique completion states of execution of the application according to the received sets of completion parameters; and
   the plurality of computing nodes, respectively comprising at least one processor and memory configured to:
      execute individual ones of the plurality of execution runtimes to termination according to one or more termination conditions; and
      return respective sets of completion parameters to the application debugger.

2. The system of claim 1, wherein the application debugger is provided as part of an application development service of a provider network, wherein the plurality of computing nodes implement a compute service of the provider network, and wherein the plurality of execution runtimes are created using respective virtual machines of the compute service of the provider network.

3. The system of claim 1, wherein the application debugger executes interactively on behalf of the client, and wherein the plurality of execution runtimes respectively execute non-interactively on behalf of the application debugger.

4. The system of claim 1, wherein an execution coordinator executes non-interactively, wherein the plurality of initial states of execution of the application define a test case for a phase of a software testing life cycle; and wherein the one or more unique completion states of execution of the application comprise at least a passing completion state and a failing completion state.

5. A method, comprising:
receiving a request to execute a plurality of execution runtimes of an application, the plurality of execution runtimes comprising respective unique sets of application parameters defining a plurality of initial states of execution of an application;
causing execution of the plurality of execution runtimes for the application corresponding to respective ones of the plurality of initial states, wherein the plurality of execution environments differ according to the respective unique sets of application parameters;
executing, at a plurality of computing nodes different from a computing node hosting the execution coordinator, individual ones of the plurality of execution runtimes to termination according to one or more termination conditions; and
returning respective sets of completion parameters defining one or more unique completion states of execution of the application.

6. The method of claim 5, wherein an execution coordinator is an application debugger, wherein the sets of application parameters comprise respective sets of initialization values for different variables of the application, and wherein the one or more termination conditions comprise execution breakpoints.

7. The method of claim 6, wherein a number of unique completion states of execution of the application is less than a number of unique initial states of execution of the application, and wherein the method further comprises:
analyzing the unique completion states of execution of the application to identify a portion of the unique initial states of execution of the application corresponding to the unique completion states of execution of the application; and
returning, by the execution coordinator to the client via the programmatic interface, the portion of the unique initial states of execution of the application.

8. The method of claim 7, further comprising:
selecting respective additional unique sets of application parameters defining a second plurality of initial states of execution of an application according to the completion parameters defining the one or more unique completion states of execution of the application;
creating a second plurality of execution runtimes for the application corresponding to respective ones of the second plurality of initial states, wherein the second plurality of execution environments differ according to the respective additional unique sets of application parameters;
individually executing the second plurality of execution runtimes to termination according to one or more additional termination conditions; and
returning, by the execution coordinator to the client via the programmatic interface, respective second sets of completion parameters defining a second one or more unique completion states of execution of the application.

9. The method of claim 6, wherein the application debugger is provided as part of an application development service of a provider network, wherein the provider network comprises a compute service, and wherein the plurality of execution runtimes are created using respective virtual machines of the compute service of the provider network.

10. The method of claim 6, wherein the application debugger executes interactively on behalf of the client, and wherein the plurality of execution runtimes respectively execute non-interactively on behalf of the application debugger.

11. The method of claim 6, wherein the plurality of execution runtimes are created using respective virtual machines provided by a non-interactive application debugging service of a provider network.

12. The method of claim 5, wherein an execution coordinator executes non-interactively, wherein the plurality of initial states of execution of the application define a test case for a phase of a software testing life cycle; and wherein the one or more unique completion states of execution of the application comprise at least a passing completion state and a failing completion state.

13. A non-transitory, computer-readable storage medium, storing program instructions that when executed on a computing device, causes the computing device to implement:
receiving a request to execute a plurality of execution runtimes of an application, the plurality of execution runtimes comprising respective unique sets of application parameters defining a plurality of initial states of execution of an application;
causing execution of the plurality of execution runtimes for the application corresponding to respective ones of the plurality of initial states, wherein the plurality of execution environments differ according to the respective unique sets of application parameters;
executing, at a plurality of computing nodes different from a computing node hosting the execution coordinator, individual ones of the plurality of execution runtimes to termination according to one or more termination conditions; and
returning respective sets of completion parameters defining one or more unique completion states of execution of the application.

14. The non-transitory, computer-readable storage medium of claim 13, wherein an execution coordinator is an application debugger, wherein the sets of application parameters comprise respective sets of initialization values for different variables of the application, and wherein the one or more termination conditions comprise execution breakpoints.

15. The non-transitory, computer-readable storage medium of claim 14, wherein a number of unique completion states of execution of the application is less than a number of unique initial states of execution of the application, and wherein the method further comprises:
analyzing the unique completion states of execution of the application to identify a portion of the unique initial states of execution of the application corresponding to the unique completion states of execution of the application; and
returning, by the execution coordinator to the client via the programmatic interface, the portion of the unique initial states of execution of the application.

16. The non-transitory, computer-readable storage medium of claim 15, storing further instructions that when executed by the computing device, cause the computing device to further implement:
selecting respective additional unique sets of application parameters defining a second plurality of initial states of execution of an application according to the completion parameters defining the one or more unique completion states of execution of the application;

creating a second plurality of execution runtimes for the application corresponding to respective ones of the second plurality of initial states, wherein the second plurality of execution environments differ according to the respective additional unique sets of application parameters;

individually executing the second plurality of execution runtimes to termination according to one or more additional termination conditions; and returning, by the execution coordinator to the client via the programmatic interface, respective second sets of completion parameters defining a second one or more unique completion states of execution of the application.

17. The non-transitory, computer-readable storage medium of claim 14, wherein the application debugger is provided as part of an application development service of a provider network, wherein the provider network comprises a compute service, and wherein the plurality of execution runtimes are created using respective virtual machines of the compute service of the provider network.

18. The non-transitory, computer-readable storage medium of claim 14, wherein the application debugger executes interactively on behalf of the client, and wherein the plurality of execution runtimes respectively execute non-interactively on behalf of the application debugger.

19. The non-transitory, computer-readable storage medium of claim 14, wherein the plurality of execution runtimes are created using respective virtual machines provided by a non-interactive application debugging service of a provider network.

20. The non-transitory, computer-readable storage medium of claim 13, wherein the execution coordinator executes non-interactively, wherein the plurality of initial states of execution of the application define a test case for a phase of a software testing life cycle; and wherein the one or more unique completion states of execution of the application comprise at least a passing completion state and a failing completion state.

* * * * *